(12) United States Patent
Takayama et al.

(10) Patent No.: US 6,349,806 B1
(45) Date of Patent: Feb. 26, 2002

(54) CYLINDER APPARATUS FOR A BRAKE FLUID PRESSURE CONTROL SYSTEM

(75) Inventors: Toshio Takayama; Kunihiro Matsunaga, both of Yamanashi-ken (JP)

(73) Assignee: Tokico Ltd., Kanagawa-ken (JP)

( * ) Notice: Subject to any disclaimer, the term of this patent is extended or adjusted under 35 U.S.C. 154(b) by 0 days.

(21) Appl. No.: 09/396,422

(22) Filed: Sep. 15, 1999

(30) Foreign Application Priority Data

Sep. 30, 1998 (JP) .......................... 10-292809

(51) Int. Cl.$^7$ .................... B60T 11/20; B60T 11/224
(52) U.S. Cl. .................... 188/345; 60/562; 303/9.72
(58) Field of Search .................... 188/345, 360, 188/358, 3; 303/8, 9.63, 9.72, 9.73, 9.74; 60/562, 588, 589

(56) References Cited

U.S. PATENT DOCUMENTS

| | | | | |
|---|---|---|---|---|
| 3,796,134 A | * | 3/1974 | Kaptrosky | 91/418 |
| 3,976,171 A | * | 8/1976 | Belart | 188/345 |
| 4,305,624 A | * | 12/1981 | Belart | 303/92 |
| 4,319,456 A | * | 3/1982 | Kubota | 60/562 |
| 4,555,144 A | * | 11/1985 | Belart | 303/92 |
| 4,703,978 A | * | 11/1987 | Belart | 303/52 |
| 4,768,842 A | * | 9/1988 | Ogino | 303/114 |
| 4,996,843 A | * | 3/1991 | Levrai | 60/562 |
| 5,042,255 A | * | 8/1991 | Nakano | 60/589 |
| 5,046,316 A | * | 9/1991 | Steffes et al. | 60/562 |
| 5,074,197 A | * | 12/1991 | Mori et al. | 92/165 R |
| 5,836,659 A | * | 11/1998 | Feigel | 303/115.2 |
| 5,887,432 A | * | 3/1999 | Clauss et al. | 60/562 |
| 6,000,220 A | * | 12/1999 | Barcardit | 60/562 |
| 6,058,705 A | * | 5/2000 | Schunck | 60/562 |
| 6,141,963 A | * | 11/2000 | Gotoh et al. | 60/562 |

FOREIGN PATENT DOCUMENTS

| | | |
|---|---|---|
| DE | 196 30 219 | 1/1998 |
| JP | 07165031 | 6/1995 |
| JP | 10081227 | 3/1998 |
| WO | 97/09212 | 3/1997 |

* cited by examiner

Primary Examiner—J. J. Swann
Assistant Examiner—David Divine
(74) Attorney, Agent, or Firm—Wenderoth, Lind & Ponack, L.L.P.

(57) ABSTRACT

In a cylinder body of a cylinder apparatus of the present invention for a brake fluid pressure control system, primary and secondary pistons having different pressure-receiving areas are provided. A pressure chamber between the primary and secondary pistons is communicated with a reservoir through flow passages formed between the cylinder body and a sleeve and between the sleeve and the secondary piston. In normal operation of the brake fluid pressure control system, the cylinder apparatus serves as a stroke simulator by releasing the fluid in the pressure chamber through the flow passages to the reservoir and contracting a spring in the pressure chamber. In the event of a failure of the system, the cylinder apparatus serves as a tandem master cylinder in which the flow passages are closed by a seal member in accordance with movement of the secondary piston, and the primary and secondary pistons move, while substantially no contraction of the spring in the pressure chamber occurs.

20 Claims, 4 Drawing Sheets

CYLINDER APPARATUS FOR A BRAKE FLUID PRESSURE CONTROL SYSTEM

BACKGROUND OF THE INVENTION

The present invention relates to a brake circuit for an automobile, especially a cylinder apparatus used for a brake fluid pressure control system, a so-called brake-by-wire (BBW) system, for controlling a fluid pressure from a fluid pressure source and applying the fluid pressure to wheel cylinders in accordance with operation of a brake pedal.

The BBW system generally includes a fail-safe master cylinder which operates in the event of failure of the system, and also includes a stroke simulator for securing a desired stroke of the brake pedal in normal operation of the system. Generally, in conventional BBW systems, an accumulator or damper is used as the stroke simulator, wherein a volumetric change is effected according to the fluid pressure of the master cylinder. In such conventional BBW systems, not only the fluid to be supplied to the accumulator or damper, but also the fluid to be supplied to the wheel cylinders must be secured in the master cylinder, so that the master cylinder needs to be large.

Figure 4:
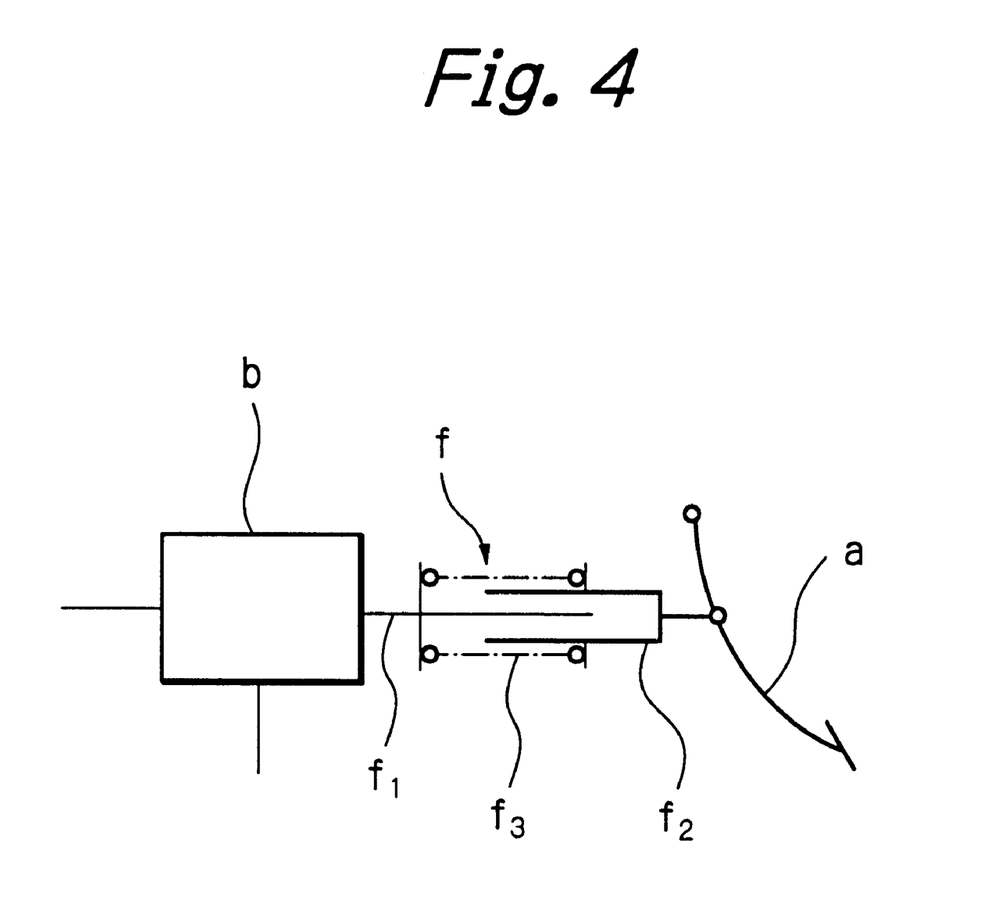
FIG. 4 is a schematic illustration showing a structure of a conventional stroke simulator.

As a countermeasure, for example, Unexamined Japanese Patent Application Public Disclosure (Kokai) No. 7-165031 proposes a brake control apparatus (BBW system) shown in FIG. 4 (an excerpt from Kokai No. 7-165031). In this apparatus, a pedal feeling adjusting mechanism (stroke simulator) f is provided between a brake pedal a and a master cylinder b. The pedal feeling adjusting mechanism f comprises: a first rod f1 provided on a side of the master cylinder b; a second rod f2 provided on a side of the brake pedal a; and a spring f3 provided between the first rod f1 and the second rod f2. In normal operation of the system, a desired stroke of the brake pedal a is secured by contracting the spring f3. In the event of failure of the system, for fail-safe operation, the second rod f2 abuts against the first rod f1, to thereby transmit a stepping force applied to the brake pedal a directly to the master cylinder b.

However, in the stroke simulator of Kokai No. 7-165031, when the master cylinder b operates for fail-safe operation, a driver needs to force the brake pedal a by a distance corresponding to the stroke of the master cylinder b (i.e., the stroke of a piston in the master cylinder b) in addition to a distance corresponding to the stroke consumed by the stroke simulator f in normal operation of the system. Thus, an invalid stroke of the brake pedal becomes large, so that the brake pedal a must be forced deeply and strongly as compared to normal braking, in order to achieve the same deceleration. Therefore, braking becomes extremely difficult.

In view of the above, the present invention has been made. It is an object of the present invention to provide a cylinder apparatus for a brake fluid pressure control system, which serves as a stroke simulator in normal operation of the system and which markedly suppresses an increase in invalid stroke of the brake pedal for fail-safe operation, to thereby secure a desired stroke of the brake pedal without impairing brake operability.

SUMMARY OF THE INVENTION

In order to achieve the above-mentioned object, the present invention provides a cylinder apparatus for a brake fluid pressure control system for controlling a fluid pressure from a fluid pressure source and applying the controlled fluid pressure to a wheel cylinder in accordance with operation of a brake pedal, the cylinder apparatus comprising a tandem master cylinder adapted to supply a fluid to the wheel cylinder in the event of failure of the brake fluid pressure control system.

The tandem master cylinder has a cylinder body, a primary piston and a secondary piston, each slidably provided in the cylinder body, and a primary pressure chamber defined between the primary piston and the secondary piston. In addition, the tandem master cylinder has a secondary pressure chamber defined between the secondary piston and the cylinder body, and communication preventing means which communicate the primary pressure chamber with a reservoir when an amount of stroke of the secondary piston reaches or falls below a predetermined level and which prevents the communication between the primary pressure chamber and the reservoir when the amount of stroke of the secondary piston exceeds the predetermined level.

In the cylinder apparatus of the present invention, in normal operation of the BBW system, the amount of stroke of the secondary piston is very small, so that the fluid in the primary pressure chamber is discharged to the reservoir by the communication preventing means and a return spring in the primary pressure chamber contracts, to thereby secure a desired stroke of the brake pedal. Thus, the cylinder apparatus as a whole serves as a stroke simulator. On the other hand, in the event of failure of the BBW system, for fail-safe operation, the fluid in the secondary pressure chamber is supplied to the wheel cylinders in one of the brake circuits, so that the amount of stroke of the secondary piston becomes large and therefore the communication preventing means prevents communication between the primary pressure chamber and the reservoir. This makes it possible to supply the fluid in the primary pressure chamber to the wheel cylinders in the other brake circuit. Therefore, the cylinder apparatus as a whole not only serves as a fail-safe master cylinder, but also serves as a tandem master cylinder which is effective for fail-safe operation in the event of failure of wheel braking circuits. Further, when the cylinder apparatus serves as the tandem master cylinder, contraction of the return spring in the primary pressure chamber, which spring serves as the stroke simulator in normal operation of the BBW system, can be minimized, so that the invalid stroke of the brake pedal can be minimized and good brake operability can be secured.

In the cylinder apparatus of the present invention, it is preferred that the primary piston have a larger pressure-receiving area than the secondary piston. By this arrangement, when the cylinder apparatus serves as the fail-safe master cylinder, the primary pressure chamber can be reduced in volume simply by moving the primary piston, so as to supply a desired amount of fluid to the wheel cylinders. Therefore, the amount of contraction of the return spring in the primary pressure chamber, which serves as the stroke simulator in normal operation of the BBW system, is very small, so that it is possible to avoid lowering of efficiency in fluid pressure generation due to a rise in reaction force from the spring.

The present invention also provides a cylinder apparatus adaptable to a brake fluid pressure control apparatus.

The cylinder apparatus has a cylinder body, a first piston slidably provided in the cylinder body to receive a braking force from a brake pedal, a second piston slidably provided in the cylinder body in a spaced relationship with the first piston, a first pressure chamber defined between the first piston and the second piston, and a second pressure chamber defined between the second piston and the cylinder body.

In addition, the cylinder apparatus has first biasing means provided in the first pressure chamber to bias the first piston and the second piston away from each other and capable of transmitting the braking force from the first piston to the second piston, second biasing means provided in the second pressure chamber to bias the second piston toward the first piston, a first discharge port for communicating the first pressure chamber with a first wheel cylinder, a second discharge port for communicating the second pressure chamber with a second wheel cylinder, a rear reservoir port provided on the rear side of the cylinder body to communicate with a reservoir, a front reservoir port provided on the front side of the cylinder body to communicate with the reservoir, a first passage for providing communication between the first pressure chamber and the rear reservoir port, a second passage for providing communication between the second pressure chamber and the front reservoir port, and a third passage for providing communication between the first pressure chamber and the front reservoir port.

Further, the cylinder apparatus has a device for preventing the communication through the first passage during braking, a device for preventing the communication through the second passage during braking, and a device for allowing the communication through the third passage in normal operation of the brake fluid pressure control apparatus during braking and preventing the communication through the third passage in the event of failure of the brake fluid pressure control apparatus during braking.

The present invention further provides a cylinder apparatus adaptable to a brake fluid pressure control apparatus.

The cylinder apparatus has a cylinder body, a first piston slidably provided in the cylinder body to receive a braking force from a brake pedal, a second piston slidably provided in the cylinder body in a spaced relationship with the first piston, a first pressure chamber defined between the first piston and the second piston, a second pressure chamber defined between the second piston and the cylinder body, first biasing means provided in the first pressure chamber to bias the first piston and the second piston away from each other and capable of transmitting the braking force from the first piston to the second piston, and second biasing means provided in the second pressure chamber to bias the second piston toward the first piston.

In addition, the cylinder apparatus has a first discharge port for communicating the first pressure chamber with a first wheel cylinder, a second discharge port for communicating the second pressure chamber with a second wheel cylinder, a rear reservoir port provided on the rear side of the cylinder body to communicate with a reservoir, a front reservoir port provided on the front side of the cylinder body to communicate with the reservoir, a first passage for providing communication between the first pressure chamber and the rear reservoir port, a second passage for providing communication between the second pressure chamber and the front reservoir port, and a third passage for providing communication between the first pressure chamber and the rear reservoir port.

Further, the cylinder apparatus has a device for preventing the communication through the first passage during braking, a device for preventing the communication through the second passage during braking, and a device for allowing the communication through the third passage in normal operation of the brake fluid pressure control apparatus during braking and preventing the communication through the third passage in the event of failure of the brake fluid pressure control apparatus during braking.

The present invention further provides a cylinder apparatus adaptable to a brake fluid pressure control apparatus.

The cylinder apparatus has a cylinder body, a first piston slidably provided in the cylinder body to receive a braking force from a brake pedal, a second piston slidably provided in the cylinder body in a spaced relationship with the first piston, a first pressure chamber defined between the first piston and the second piston, and a second pressure chamber defined between the second piston and the cylinder body.

In addition, the cylinder apparatus has first biasing means provided in the first pressure chamber to bias the first piston and the second piston away from each other and capable of transmitting the braking force from the first piston to the second piston, second biasing means provided in the second pressure chamber to bias the second piston toward the first piston, reservoir port means communicating with a reservoir, a first passage for providing communication between the first pressure chamber and the reservoir port means, a second passage for providing communication between the second pressure chamber and the reservoir port means, and a third passage for providing communication between the first pressure chamber and the reservoir port means.

Further, the cylinder apparatus has a device for preventing the communication through the first passage during braking, a device for preventing the communication through the second passage during braking, and a device for allowing the communication through the third passage in normal operation of the brake fluid pressure control apparatus during braking and preventing the communication through the third passage in the event of failure of the brake fluid pressure control apparatus during braking.

The foregoing and other objects, features and advantages of the present invention will be apparent from the following detailed description and appended claims taken in connection with the accompanying drawings.

DETAILED DESCRIPTION OF THE INVENTION

Hereinbelow, description is made of an embodiment of the present invention, with reference to the accompanying drawings.

Figure 2:
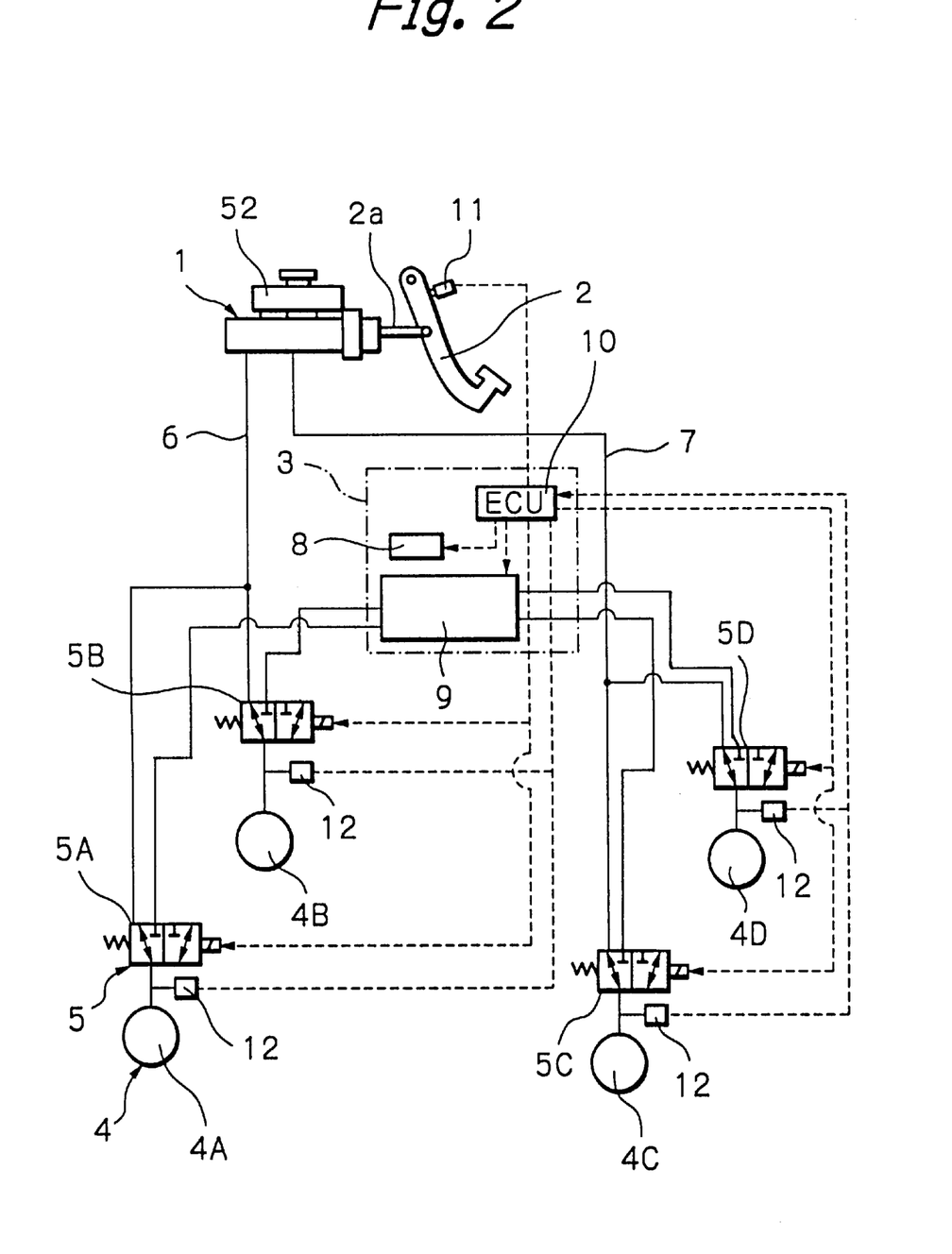
FIG. 2 is a system diagram of the brake fluid pressure control system including the cylinder apparatus.

FIG. 2 shows an entire structure of a brake fluid pressure control system (BBW system) including a cylinder apparatus according to an embodiment of the present invention, which is applied to a dual brake circuit. In FIG. 2, reference numeral 1 denotes a cylinder apparatus in this embodiment of the present invention, which is operatively connected to a brake pedal 2. Reference numeral 3 denotes a fluid pressure control apparatus which generates a predetermined fluid pressure in accordance with operation of the brake pedal 2 and applies the predetermined fluid pressure to four wheel cylinders 4 (4A, 4B, 4C, 4D). Each wheel cylinder 4 is selectively connected to the cylinder apparatus 1 or the fluid pressure control apparatus 3 by means of a fail-safe valve 5 (5A, 5B, 5C, 5D). As explained later in detail, the cylinder apparatus 1 serves not only as a tandem master cylinder, but also serves as a stroke simulator. When the cylinder apparatus 1 serves as the tandem master cylinder, the fluid pressure generated by the cylinder apparatus 1 is supplied through a pipe 6 to the wheel cylinders 4A and 4B in one of the two brake circuits and thorough a pipe 7 to the wheel cylinders 4C and 4D in the other brake circuit. The two brake circuits may be arranged to have the front wheel brakes in one circuit and the rear wheel brakes in the other circuit, or may be arranged in an X-shaped configuration. During non-braking, the position of each fail-safe valve 5 is set to connect the wheel cylinder 4 to the cylinder apparatus 1.

In this embodiment, the fluid pressure control apparatus 3 comprises a fluid pressure source 8, a fluid pressure control valve 9 and an electronic control unit (ECU) 10. The fluid pressure control valve 9 contains a linear solenoid (not shown) which is actuated in response to a command from the ECU 10, and controls the fluid pressure from the fluid pressure source 8 according to thrust of the solenoid. When a stepping force is applied to the brake pedal 2, a brake lamp switch 11 detects the application of the stepping force and emits a signal. The signal is transmitted to the ECU 10, and the ECU 10 switches the position of each fail-safe valve 5 (5A, 5B, 5C, 5D) to connect the wheel cylinder 4 to the fluid pressure control apparatus 3. Further, the ECU 10 controls energization of the linear solenoid in the fluid pressure control valve 9. Consequently, the fluid pressure control valve 9 generates the predetermined fluid pressure, and the fluid pressure is equally applied through the fail-safe valves 5 to the four wheel cylinders 4 (4A, 4B, 4C, 4D). When a fluid pressure sensor 12 corresponding to each wheel cylinder 4 detects that no rise in fluid pressure occurs in the wheel cylinder 4 regardless of the application of fluid pressure, the ECU 10 switches the position of each fail-safe valve 5 to the position shown in FIG. 2, so as to apply the fluid pressure generated by the cylinder apparatus 1 directly to each wheel cylinder 4.

Figure 1:
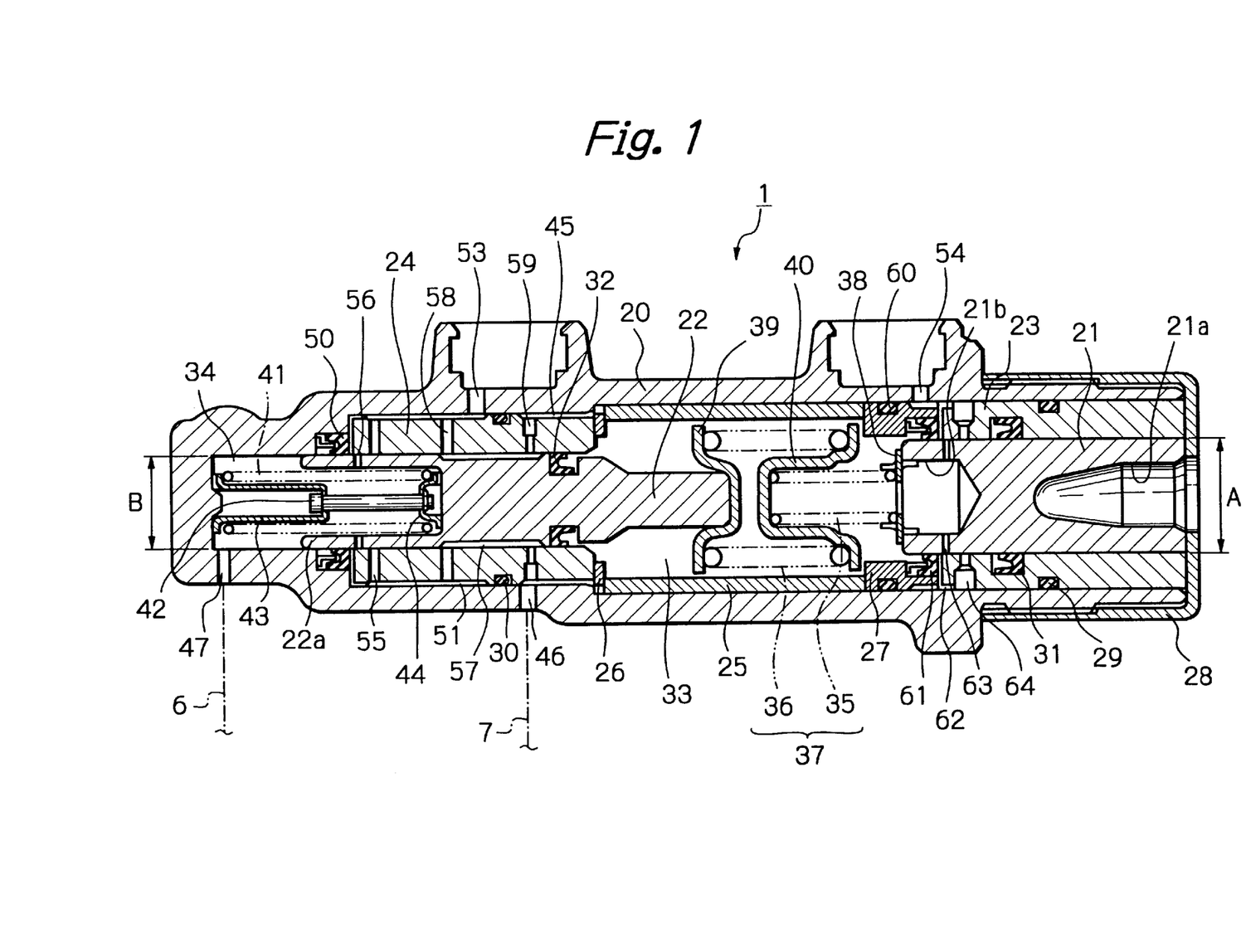
FIG. 1 is a cross-sectional view showing a structure of a cylinder apparatus for a brake fluid pressure control system, according to an embodiment of the present invention.

As shown in FIG. 1, the cylinder apparatus 1 comprises a cylinder body 20 in a cylindrical form having one end closed. Two pistons, that is, a first piston 21 and a second piston 22 are slidably provided in the cylinder body 20. Sleeves 23 and 24 are also provided in the cylinder body 20 so as to guide the sliding movement of the first piston 21 and the second piston 22, respectively. The sleeve 23 and the sleeve 24 are connected to each other through a spacer 25 and stop rings 26 and 27 provided at the front and rear of the spacer 25. A cup-shaped cover 28 is threadably engaged with an exterior of an open end of the cylinder body 20 so as to fix the sleeves 23 and 24.

A space between the sleeve 23 and the cylinder body 20 is sealed with an O-ring 29 and a space between the sleeve 24 and the cylinder body 20 is sealed with an O-ring 30 capable of sliding on an inner wall surface of the cylinder body 20. A space between the first piston 21 and the sleeve 23 (hereinafter, frequently referred to as "the first sleeve 23") provided on a side of the open end of the cylinder body 20 is sealed with a seal member 31 held by the sleeve 23. A space between the second piston 22 and the sleeve 24 (hereinafter, frequently referred to as "the second sleeve 24") provided on a side of the closed end of the cylinder body 20 is sealed with a seal member 32 held by the second piston 22. Thus, two sealable pressure chambers, namely, a first pressure chamber 33 and a second pressure chamber 34 are defined in the cylinder body 20 between the first piston 21 and the second piston 22 and between the second piston 22 and the closed end of the cylinder body 20, respectively.

A first spring 37 comprising two spring bodies 35 and 36 is provided in the first pressure chamber 33 to bias the first piston 21 and the second piston 22 away from each other. The spring bodies 35 and 36 are arranged in tandem between spring bearings 38 and 39, with a spring bearing 40 being provided between the spring bodies 35 and 36. The spring bearing 38 is mounted on a forward end of the first piston 21. The spring bearing 39 is mounted on a shaft end of the second piston 22. The spring bearing 40 is held between the spring bodies 35 and 36 without being fixed to any members. On the other hand, a forward end portion of the second piston 22 (on a side first entering the cylinder body 20 when the second piston 22 is inserted into the cylinder body 20) provides a cup portion 22a, and a second spring 41 is provided in the second pressure chamber 34 including the cup portion 22a. Two cup-shaped spring bearings 43 and 44 are connected to each other through a shaft member 42 which slidably moves to vary the distance between the spring bearings 43 and 44. The second spring 41 has opposite ends seated on the spring bearings 43 and 44. During non-braking, the second spring 41 biases the second piston 22 to a position closest to the first piston 21.

An annular passage 45 is formed around the second sleeve 24 on a side closer to the first pressure chamber 33 relative to the O-ring 30. A first discharge port 46 formed in the cylinder body 20 opens to the annular passage 45. A second discharge port 47 formed in a forward end portion of the cylinder body 20 opens to the second pressure chamber 34. The annular passage 45 around the second sleeve 24 communicates with the first pressure chamber 33 through a channel formed in the front stop ring 26. Therefore, the first discharge port 46 substantially opens to the first pressure chamber 33. The second discharge port 47 is connected to one end of the pipe 6 extending from the wheel cylinders 4A and 4B in the one brake circuit. The first discharge port 46 is connected to one end of the pipe 7 extending from the wheel cylinders 4C and 4D in the other brake circuit.

The above-mentioned elements are substantially the same as the elements of a general-purpose tandem master cylinder. The first piston 21 and the second piston 22, respectively, correspond to a primary piston and a secondary piston in the general-purpose tandem master cylinder. The first pressure chamber 33 and the second pressure chamber 34, respectively, correspond to a primary pressure chamber and a secondary pressure chamber in the general-purpose tandem master cylinder. The first spring 37 and the second spring 41, respectively, correspond to a primary return spring and a secondary return spring in the general-purpose tandem master cylinder. The first piston 21 has a recess 21a at a rear end portion thereof to receive an input shaft 2a (FIG. 2) extending from the brake pedal 2. Thus, the first piston 21 is adapted to advance within the cylinder body 20 toward the second piston 22 in accordance with a stepping force applied to the brake pedal 2.

A set load of the second spring 41 in the second pressure chamber 34 is larger than a combined set load of the spring bodies 35 and 36 of the first spring 37. Therefore, the second piston 22 is normally positioned at its retraction end where the shaft member 42 is extended to the maximum degree. With respect to the two spring bodies 35 and 36 of the first spring 37, a spring constant of one spring body 35 is set to be smaller than that of the other spring body 36. Therefore, the first spring 37 is adapted to extend and contract in two steps. Further, with respect to the first piston 21 and the second piston 22, a pressure-receiving area A of the first piston 21 is set to be larger than a pressure-receiving area B of the second piston 22.

A seal member 50 is held by the cylinder body 20 to sealingly engages the cup portion 22a of the second piston 22. Further, an annular chamber 51 having one end closed by the O-ring 30 is formed around a forward end portion of the second sleeve 24. On the other hand, two reservoir ports 53 and 54 are formed on the front side and the rear side of the cylinder body 20 in a spaced relationship with each other, so as to individually communicate with separate chambers in a reservoir 52 (FIG. 2). The front reservoir port 53 opens to the annular chamber 51. The annular chamber 51 communicates with the second pressure chamber 34 through a port 55 formed in the second sleeve 24 and a port 56 formed in the cup portion 22a of the second piston 22. The port 56 in the cup portion 22a of the second piston 22 is positioned slightly rearward from the seal member 50 when the second piston 22 is located at the retraction end. Therefore, when the second piston 22 slightly advances from the retraction end, the port 56 is closed by the seal member 50, to thereby seal the second pressure chamber 34.

An annular chamber 57 is formed around the second piston 22. The annular chamber 57 communicates with ports 58 and 59 formed in the second sleeve 24, which ports, respectively, communicate with the annular chamber 51 and the annular passage 45 around the second sleeve 24. When the second piston 22 is located at the retraction end, the seal member 32 held by the second piston 22 is positioned slightly rearward (toward a side having the first pressure chamber 33) from the port 59 communicating with the annular passage 45. Thus, when the second piston 22 is located at the retraction end, the first pressure chamber 33 communicates with the reservoir 52 through the annular passage 45 around the second sleeve 24, the port 59 in the second sleeve 24, the annular chamber 57 around the second piston 22, the port 58 in the second sleeve 24, the annular chamber 51 around the second sleeve 24 and the front reservoir port 53 in the cylinder body 20. It should be noted that the port 59 in the second sleeve 24 is partly restricted, to thereby form an orifice.

The stop ring 27 in front of the first sleeve 23 holds an O-ring 60 which sealingly engages the cylinder body 20 and a seal member 61 which sealingly engages first piston 21. Further, a common annular chamber 62 is formed around the first sleeve 23 and the rear stop ring 27 between the O-ring 29 and the O-ring 60. The rear reservoir port 54 in the cylinder body 20 opens to the annular chamber 62. A recess 21b is formed at a forward end portion of the first piston 21 to communicate with the first pressure chamber 33. The recess 21b also communicates with the annular chamber 62 through a port 63 formed in the first piston 21 and a port 64 formed in the first sleeve 23. When the first piston 21 is located at its retraction end, the port 63 is positioned slightly rearward (toward the open end of the cylinder body 20) from the seal member 61 held by the rear stop ring 27. Thus, when the first piston 21 is located at the retraction end, the first pressure chamber 33 communicates with the reservoir 52 through the port 63 in the first piston 21, the port 64 in the first sleeve 23, the annular chamber 62 around the first sleeve 23 and the rear reservoir port 54 in the cylinder body 20.

Next, explanation is made of an operation of the BBW system including the cylinder apparatus 1 arranged as mentioned above.

First, explanation is made of an operation of the BBW system when the fluid pressure control apparatus 3 is normally operated. In normal operation of the fluid pressure control apparatus 3 during braking, the fail-safe valves 5 are switched to connect the wheel cylinders 4 to the fluid pressure control apparatus 3, so that no fluid in the first and second pressure chambers 33 and 34 in the cylinder apparatus 1 is discharged to the wheel cylinders 4. When the brake pedal 2 is depressed in this state, the first piston 21 advances, thus increasing reaction force of the first spring 37 and starting advancement of the second piston 22. When both the first piston 21 and the second piston 22 advance, the port 63 in the first piston 21 is closed by the seal member 61, to thereby prevent communication between the first pressure chamber 33 and the rear reservoir port 54 in the cylinder body 20. On the other hand, the port 56 in the second piston 22 is closed by the seal member 50, so that the fluid is confined in the second pressure chamber 34 and the second piston 22 stops immediately.

When the second piston 22 is stopped, the seal member 32 held by the second piston 22 does not close the port 59 in the second sleeve 24, so that the fluid in the first pressure chamber 33 is released into the reservoir 52 through the annular passage 45, the port 59, the annular chamber 57, the port 58, the annular chamber 51 and the front reservoir port 53 in the cylinder body 20. Consequently, the first spring 37 freely contracts, so that a desired stroke of the brake pedal 2 can be secured by contraction of the first spring 37 and the cylinder apparatus 1 serves as a stroke simulator. With respect to the first spring 37, it should be noted that because the spring constant of the spring body 35 is set to be smaller than that of the spring body 36, contraction of the first spring 37 is effected first mainly by contraction of the spring body 35, and then effected only by contraction of the spring body 36. That is, when the brake pedal 2 is depressed, a rate of increase in reaction force becomes high, at an intermediate point during depression of the brake pedal 2, thereby providing a driver with pedal feeling adapted to actual braking. In the case of quick braking, the orifice-shaped port 59 provides a large flow resistance to the fluid discharged from the first pressure chamber 33 to the reservoir 52. This generates a reaction force component corresponding to the speed of operation of the brake pedal 2, so that pedal feeling adapted to actual braking can be secured.

Next, explanation is made of an operation of the BBW system in the event of failure of the fluid pressure control apparatus 3. In the event of failure of the fluid pressure control apparatus 3 during braking, the fail-safe valves 5 are switched to connect the wheel cylinders 4 to the cylinder apparatus 1. When the brake pedal 2 is depressed in this state, the first piston 21 and the second piston 22 advance as a unit and the fluid in the second pressure chamber 34 is discharged through the second discharge port 47 to the wheel cylinders 4A and 4B in the one brake circuit. Consequently, the seal member 32 held by the second piston 22 closes the port 59 in the second sleeve 24, to thereby prevent communication between the first pressure chamber 33 and the reservoir 52. On the other hand, the first pressure chamber 33 is communicated with the wheel cylinders 4C and 4D in the other brake circuit. In this case, the first pressure chamber 33 is reduced in volume by advancement of the first piston 21 having a larger pressure-receiving area than the second piston 22, and a desired amount of fluid is supplied from the first pressure chamber 33 to the wheel cylinders 4C and 4C in the other brake circuit. Thus, the cylinder apparatus 1 serves as a tandem master cylinder which is generally used. That is, the cylinder apparatus 1 is effective for fail-safe operation not only in the event of failure of the fluid pressure control apparatus 3, but also in the event of failure of the wheel braking circuits. Further, due to the above-mentioned difference in pressure-receiving area, the first piston 21 and the second piston 22 move while maintaining a distance therebetween substantially at a predetermined level, so that substantially no contraction of the first spring 37 occurs. This makes the invalid stroke nearly zero, thereby securing desired brake operability. Further, since substantially no contraction of the first spring 37 occurs, it is possible to avoid the lowering of efficiency in fluid pressure generation in the first pressure chamber 33 due to a reaction force from the first spring 37.

Figure 3:
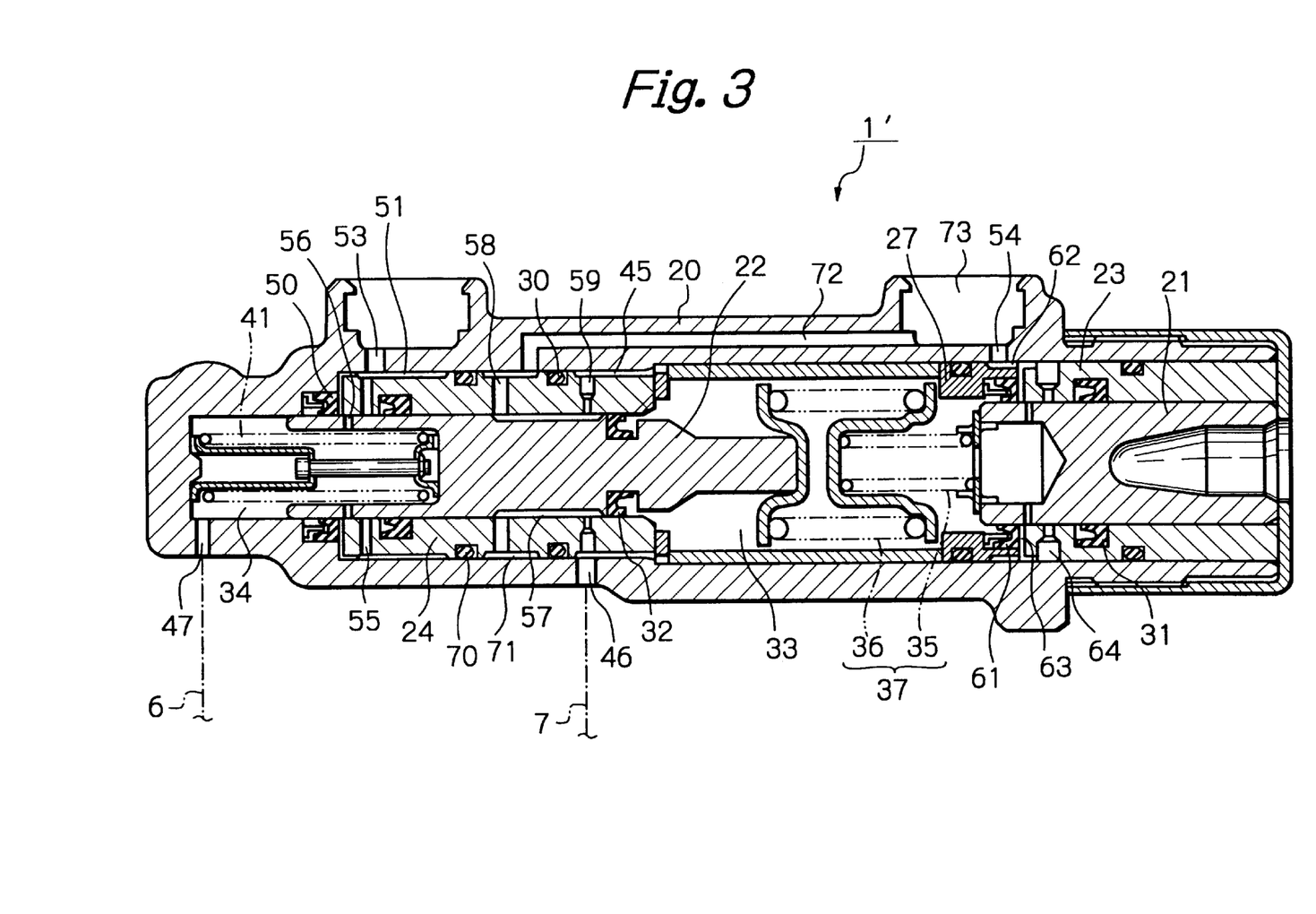
FIG. 3 is a cross-sectional view showing a structure of a cylinder apparatus for a brake fluid pressure control system, according to another embodiment of the present invention.

FIG. 3 shows a structure of a cylinder apparatus 1' according to another embodiment of the present invention. A basic structure of the cylinder apparatus 1' is the same as that of the cylinder apparatus 1 shown in FIG. 1. Therefore, in FIG. 3, the same elements as those of the cylinder apparatus 1 are designated by the same reference numerals as used in FIG. 1 with explanation thereof being omitted. A characteristic feature of this embodiment resides in that the flow path between the first pressure chamber 33 and the front reservoir port 53 is completely blocked and the first pressure chamber 33 is communicated with the chamber in the reservoir 52 communicating with the rear reservoir port 54. Therefore, in the cylinder apparatus 1', an annular chamber 71 is formed by dividing the annular chamber 51, which is formed around the second sleeve 24 to communicate with the reservoir port 53, into two chambers on the front side and the rear side by an O-ring 70 held by the second sleeve 24. The thus formed annular chamber 71 between the O-rings 70 and 30 is communicated through an axial passage 72 formed in a wall of the cylinder body 20 with a reservoir-mounting portion 73 to which the rear reservoir port 54 opens.

In the cylinder apparatus 1', during non-braking, the first pressure chamber 33 and the second pressure chamber 34, respectively, communicate with the two separate chambers in the reservoir 52. Therefore, even when failure occurs in, for example, the pipe 6 communicating with the second pressure chamber 34 and the fluid in one chamber in the reservoir 52 is exhausted during non-braking, a sufficiently large amount of fluid can be held in the first pressure chamber 33 communicating with the other chamber in the reservoir 52. Thus, the function of the cylinder apparatus 1' as a fail-safe master cylinder can be maintained, leading to high reliability of the apparatus. In the cylinder apparatus 1 (FIG. 1) in the above-mentioned embodiment, during non-braking, the first pressure chamber 33 and the second pressure chamber 34 communicate with each other and also communicate with the same chamber in the reservoir 52. Therefore, in the event of failure of the pipe 6 such as mentioned above, the fluid in the reservoir 52 is completely discharged to the outside.

When no failure occurs in the wheel braking circuits, the cylinder apparatus 1' operates in substantially the same manner as the cylinder apparatus 1. When the cylinder apparatus 1' serves as a stroke simulator, the fluid in the first pressure chamber 33 flows into the reservoir 52 through the annular chamber 71, the axial passage 72 and the reservoir-mounting portion 73. When the cylinder apparatus 1' serves as a fail-safe tandem master cylinder, the seal member 32 closes the port 59 in the second sleeve 24 to prevent communication between the first pressure chamber 33 and the reservoir 52.

As has been described above in detail, the cylinder apparatus of the present invention for a brake fluid pressure control system serves as a stroke simulator in normal operation of the system, and serves as a fail-safe master cylinder in the event of failure of the system, instead of serving as the stroke simulator. Therefore, not only can a desired stroke of the brake pedal be secured in normal operation of the system, but also an increase in invalid stroke of the brake pedal can be suppressed for fail-safe operation to prevent lowering of brake operability.

Further, when the cylinder apparatus serves as the fail-safe master cylinder, it also serves as a tandem master cylinder. Therefore, the cylinder apparatus is effective for fail-safe operation in the event of failure of the wheel braking circuits, leading to high reliability of the apparatus.

Further, a reaction force component corresponding to the speed of operation of the brake pedal is generated due to the flow resistance imparted to the fluid discharged from the primary pressure chamber to the reservoir, so that desired pedal feeling can be secured in normal operation of the system.

Further, when the primary piston has a larger pressure-receiving area than the secondary piston, in the case of the cylinder apparatus serving as the fail-safe master cylinder, the primary piston and the secondary piston move while maintaining a predetermined distance therebetween. Therefore, the amount of contract of the return spring in the primary pressure chamber, which spring serves as the stroke simulator in the event of normal operation of the system, can be minimized, so that it is possible to avoid the lowering of efficiency in fluid pressure generation due to a rise in reaction force from the spring.

The entire disclosure of Japanese Patent Application No. (Hei) 10-292809 filed on Sep. 30, 1998 including specification, claims, drawings and summary is incorporated herein by reference in its entirety.

What is claimed is:

1. A cylinder apparatus for a brake fluid pressure control system for controlling a fluid pressure from a fluid pressure source and applying the controlled fluid pressure to a wheel cylinder in accordance with operation of a brake pedal, the cylinder apparatus comprising a tandem master cylinder adapted to supply a fluid to the wheel cylinder in the event of failure of the brake fluid pressure control system, the tandem master cylinder comprising:
a cylinder body;
a primary piston and a secondary piston, each slidably provided in the cylinder body, thereby defining a primary pressure chamber between the primary piston and the secondary piston and a secondary pressure chamber between the secondary piston and the cylinder body;
communication means which allows for communication of the primary pressure chamber with a reservoir when an amount of stroke of the secondary piston reaches or is below a predetermined level; and
preventing means provided on the secondary piston which prevents the communication between the primary pressure chamber and the reservoir in response to the amount of stroke of the secondary piston exceeding the predetermined level.

2. A cylinder apparatus according to claim 1, wherein the primary piston has a larger pressure-receiving area than the secondary piston.

3. A cylinder apparatus adaptable to a brake fluid pressure control apparatus, the cylinder apparatus comprising:
a cylinder body having front and rear sides;
a first piston slidably provided in the cylinder body to receive a braking force from a brake pedal;
a second piston slidably provided in the cylinder body in a spaced relationship with the fast piston, thereby defining a first pressure chamber between the first piston and the second piston and a second pressure chamber between the second piston and the cylinder body;

first biasing means provided in the first pressure chamber to bias the first piston and the second piston away from each other and capable of transmitting the braking force from the first piston to the second piston;

second biasing means provided in the second pressure chamber to bias the second piston toward the first piston;

a first discharge port for providing communication between the first pressure chamber and a first wheel cylinder;

a second discharge port for providing communication between the second pressure chamber and a second wheel cylinder;

a rear reservoir port provided on the rear side of the cylinder body to communicate with a reservoir;

a front reservoir port provided on the front side of the cylinder body to communicate with the reservoir;

a first passage for providing communication between the first pressure chamber and the rear reservoir port;

a second passage for providing communication between the second pressure chamber and the front reservoir port;

a third passage for providing communication between the first pressure chamber and the front reservoir port;

a device for preventing the communication through the first passage during braking;

a device for preventing the communication through the second passage during braking;

a device for allowing the communication through the third passage in normal operation of the brake fluid pressure control apparatus during braking such that the first piston is displaced towards the second piston so as to not pressurize the first pressure chamber; and a device for preventing the communication through the third passage in the event of failure of the brake fluid pressure control apparatus during braking such that the first piston is displaced toward the second piston so as to pressurize the first pressure chamber and the second pressure chamber.

4. A cylinder apparatus according to claim 3, wherein the first piston has a larger pressure-receiving area than the second piston.

5. A cylinder apparatus according to claim 4, further comprising:

a first sleeve provided in the cylinder body on one side thereof, the first piston being slidably received in the first sleeve; and a second sleeve provided in the cylinder body on another side thereof opposite to the first sleeve, the second piston being slidably received in the second sleeve.

6. A cylinder apparatus according to claim 5, further comprising an O-ring provided in the second sleeve for sealingly engaging with an inner wall surface of the cylinder body, and wherein the third passage includes:

a first annular passage and a second annular passage, each defined by the second sleeve, the cylinder body and the O-ring;

an annular chamber defined between the second sleeve and the second piston;

a first port formed in the second sleeve to provide communication between the first annular passage and the annular chamber; and a second port formed in the second sleeve to provide communication between the annular chamber and the second annular passage, wherein the first annular passage communicates with the first pressure chamber, the second annular passage communicates with the front reservoir port.

7. A cylinder apparatus according to claim 6, wherein the device for preventing the communication through the third passage includes a seal member provided in the second piston, the seal member being capable of sealing the first port.

8. A cylinder apparatus according to claim 3, wherein in normal operation of the brake fluid pressure control apparatus during braking, the first discharge port and the second discharge port are prevented from communicating with the first wheel cylinder and the second wheel cylinder, respectively, in accordance with operation of the brake pedal and wherein in the event of failure of the brake fluid pressure control apparatus during braking, the first discharge port and the second discharge port are communicated with the first wheel cylinder and the second wheel cylinder, respectively.

9. A cylinder apparatus adaptable to a brake fluid pressure control apparatus, the cylinder apparatus comprising:

a cylinder body having front and rear sides;

a first piston slidably provided in the cylinder body to receive a braking force from a brake pedal;

a second piston slidably provided in the cylinder body in a spaced relationship with the first piston, thereby defining a first pressure chamber between the first piston and the second piston and a second pressure chamber between the second piston and the cylinder body;

first biasing means provided in the first pressure chamber to bias the first piston and the second piston away from each other and capable of transmitting the braking force from the first piston to the second piston;

second biasing means provided in the second pressure chamber to bias the second piston toward the first piston;

a first discharge port for providing communication between the first pressure chamber and a first wheel cylinder;

a second discharge port for providing communication between the second pressure chamber and a second wheel cylinder;

a rear reservoir port provided on the rear side of the cylinder body to communicate with a reservoir;

a front reservoir port provided on the front side of the cylinder body to communicate with the reservoir;

a first passage for providing communication between the first pressure chamber and the rear reservoir port;

a second passage for providing communication between the second pressure chamber and the front reservoir port;

a third passage for providing communication between the first pressure chamber and the rear reservoir port;

a device for preventing the communication through the first passage during braking;

a device for preventing the communication through the second passage during braking; and a device for allowing the communication through the third passage in normal operation of the brake fluid pressure control apparatus during braking such that the first piston is displaced toward the second piston so as to not pressurize the first pressure chamber; and a device for preventing the communication through the third passage in the event of failure of the brake fluid pressure control apparatus during braking such that the first piston is displaced towards the second piston so as to pressurize the first pressure chamber and the second pressure chamber.

10. A cylinder apparatus according to claim 9, wherein the first piston has a larger pressure-receiving area than the second piston.

11. A cylinder apparatus according to claim 10, further comprising:

a first sleeve provided in the cylinder body on one side thereof, the first piston being slidably received in the first sleeve; and a second sleeve provided in the cylinder body on another side thereof opposite to the first sleeve, the second piston being slidably received in the second sleeve.

12. A cylinder apparatus according to claim 11, further comprising an O-ring provided in the second sleeve for sealingly engaging with an inner wall surface of the cylinder body, and wherein the third passage includes:

a first annular passage and a second annular passage, each defined by the second sleeve, the cylinder body and the O-ring;

an annular chamber defined between the second sleeve and the second piston;

a first port formed in the second sleeve to provide communication between the first annular passage and the annular chamber;

a second port formed in the second sleeve to provide communication between the annular chamber and the second annular passage; and an axial passage formed in the cylinder body to provide communication between the second annular passage and the rear reservoir port, wherein the first annular passage communicates with the first pressure chamber.

13. A cylinder apparatus according to claim 12, wherein the device for preventing the communication through the third passage includes a seal member provided in the second piston, the seal member being capable of sealing the first port.

14. A cylinder apparatus according to claim 9, wherein in normal operation of the brake fluid pressure control apparatus during braking, the first discharge port and the second discharge port are prevented from communicating with the first wheel cylinder and the second wheel cylinder, respectively, in accordance with operation of the brake pedal and wherein in the event of failure of the brake fluid pressure control apparatus during braking, the first discharge port and the second discharge port are communicated with the first wheel cylinder and the second wheel cylinder, respectively.

15. A cylinder apparatus adaptable to a brake fluid pressure control apparatus, the cylinder apparatus comprising:

a cylinder body having front and rear sides;

a first piston slidably provided in the cylinder body to receive a braking force from a brake pedal;

a second piston slidably provided in the cylinder body in a spaced relationship with the first piston, thereby defining a first pressure chamber between the first piston and the second piston and a second pressure chamber defined between the second piston and the cylinder body;

first biasing means provided in the first pressure chamber to bias the first piston and the second piston away from each other and capable of transmitting the braking force from the first piston to the second piston;

second biasing means provided in the second pressure chamber to bias the second piston toward the first piston;

reservoir port means for communicating with a reservoir;

a first passage for providing communication between the first pressure chamber and the reservoir port means;

a second passage for providing communication between the second pressure chamber and the reservoir port means;

a third passage for providing communication between the first pressure chamber and the reservoir port means;

a device for preventing the communication through the first passage during braking;

a device for preventing the communication through the second passage during braking;

a device for allowing the communication through the third passage in normal operation of the brake fluid pressure control apparatus during braking such that the first piston is displaced toward the second piston so as to not pressurize the first pressure chamber; and a device for preventing the communication through the third passage in the event of failure of the brake fluid pressure control apparatus during braking such that the first piston is displaced towards the second piston so as to pressurize the first pressure chamber and the second pressure chamber.

16. A cylinder apparatus according to claim 15, wherein the first piston has a larger pressure-receiving area than the second piston.

17. A cylinder apparatus according to claim 15, further comprising:

a first discharge port for providing communication between the first pressure chamber with a first wheel cylinder; and a second discharge port for providing communication between the second pressure chamber with a second wheel cylinder, wherein in normal operation of the brake fluid pressure control apparatus during braking, the first discharge port and the second discharge port are prevented from communicating with the first wheel cylinder and the second wheel cylinder, respectively, in accordance with operation of the brake pedal and wherein in the event of failure of the brake fluid pressure control apparatus during braking, the first discharge port and the second discharge port are communicated with the first wheel cylinder and the second wheel cylinder, respectively.

18. A cylinder apparatus according to claim 15, wherein the reservoir port means includes:

a rear reservoir port provided on the rear side of the cylinder body to communicate with the reservoir; and a front reservoir port provided on the front side of the cylinder body to communicate with the reservoir.

19. A cylinder apparatus for a brake fluid pressure control system for controlling a fluid pressure from a fluid pressure source and applying the controlled fluid pressure to a wheel cylinder in accordance with operation of a brake pedal, the cylinder apparatus comprising a tandem master cylinder adapted to supply a fluid to the wheel cylinder in the event of failure of the brake fluid pressure control system, the tandem master cylinder comprising:
- a cylinder body;
- a primary piston and a secondary piston, each slidably provided in the cylinder body, thereby defining a primary pressure chamber between the primary piston and the secondary piston and a secondary pressure chamber between the secondary piston and the cylinder body;
- communication means which allows for communication of the primary pressure chamber with a reservoir when an amount of stroke of the secondary piston reaches or is below a predetermined level; and
- preventing means provided on the secondary piston which prevents the communication between the primary pressure chamber and the reservoir via the communication means when the amount of stroke of the secondary piston exceeds the predetermined level.

20. A cylinder apparatus according to claim 19, wherein the primary piston has a larger pressure-receiving area than the secondary piston.

* * * * *